No. 823,718.  
PATENTED JUNE 19, 1906.
H. FREIMANN.  
INSECT TRAP.  
APPLICATION FILED MAR. 7, 1906.
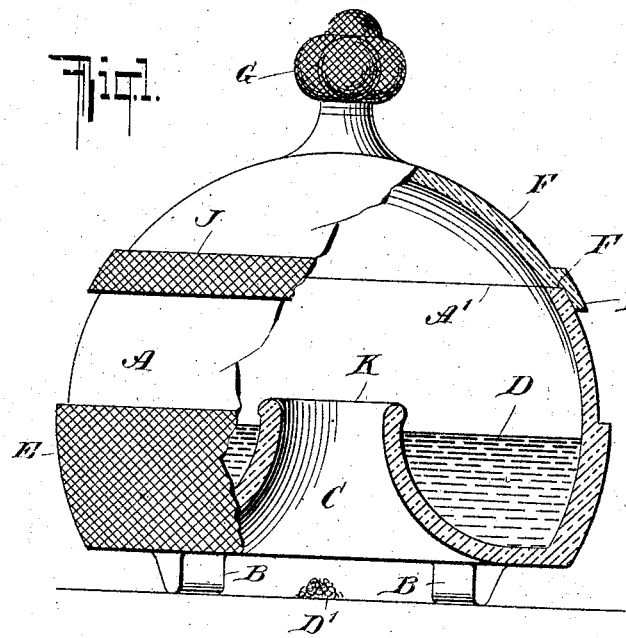
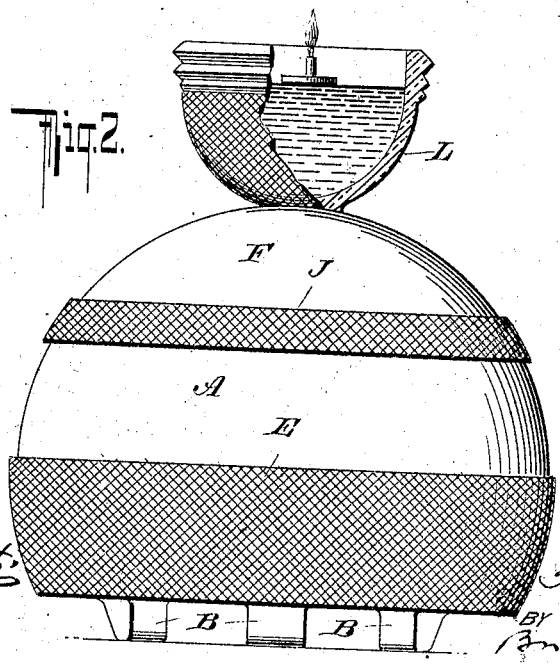
WITNESSES  
INVENTOR  
ATTORNEYS

UNITED STATES PATENT OFFICE.

HENRY FREIMANN, OF FORT WADSWORTH, NEW YORK.

INSECT-TRAP.

No. 823,718.　　　　Specification of Letters Patent.　　　　Patented June 19, 1906.

Application filed March 7, 1906. Serial No. 304,647.

*To all whom it may concern:*

Be it known that I, HENRY FREIMANN, a citizen of the United States, and a resident of Fort Wadsworth, Staten Island, county of Richmond, city and State of New York, have invented certain new and useful Improvements in Insect-Traps, of which the following is a specification.

My invention relates to traps for catching flies or other insects, and has for its object to provide an improved insect-trap of the transparent type which will be free from certain objectionable features, such as the difficulty of filling them and the unpleasant sight presented by a number of dead flies floating about.

My invention consists in the construction and arrangements of parts pointed out in the appended claims.

In the accompanying drawings, Figure 1 is an elevation of one form of my invention, partly in section; and Fig. 2 is a similar view of another form.

The general exterior shape of my insect-trap is that of a bell.

The body A is provided with feet B to raise its lower edge above the plate, table, or other support on which the trap is set. The body is formed with an internal bottom lip or flange C, forming with the outer wall of the body a ring-shaped trough D, adapted to be filled with the liquid in which the insects are to be drowned or poisoned. The outer surface of the body is provided with a band E, ground, cut, molded, or otherwise fashioned, so as to reflect the light or to render the contents of the trough D invisible from the outside. The disagreeable spectacle of dead or struggling flies floating in the trough is thus concealed from view. The body A terminates at an edge A', which is preferably vertically above the trough D, so that when the cover F is removed it is easy to fill the trough. The cover F is provided with an ornamental handle G and at the bottom with a shoulder F', adapted to fit on the edge A' of the body, and with a flange H, surrounding the upper edge portion of the body. The inner surfaces of the body and of the cover are preferably flush with each other. The flange H forms part of a bead or band J, which is continued upward above the joint of the edge A' with the shoulder F', and this band I prefer to render practically non-transparent by giving it a broken outer surface or roughening the surface by grinding or in any other manner. The object of this construction is to conceal the joint between the body and the cover, as well as any insects which may get stuck at the joint, although this is not likely to occur in view of the use of a flush joint.

The flies or other insects being attracted by the smell of the liquid in the trough D or by some substance, as sugar D' spread on the plate or table below the trap, will fly up through the opening K and striking the cover F will reach the trough D, where they will be killed by the liquid. The non-transparent band E hides their struggles and the dead flies, so that this unpleasant sight is avoided. In a like manner the non-transparent band J hides the joint A' F'. The remainder of the trap being transparent, it is easy to ascertain if any flies have failed to reach the trough D. In such a case the trap is shaken until the desired result is attained, and thus the escape of flies upon lifting the cover will be prevented.

In some cases, as shown in Fig. 2, I substitute for the knob or handle G a cup L, adapted to be filled with oil or other fuel, and by the use of a floating wick a lamp is obtained the light of which will attract insects at night. The outer surface of the cup may be cut or molded, as shown, to produce refracting and reflecting surfaces, and thus increase the brilliancy of the light.

I claim as my invention—

1. An insect-trap comprising a transparent body having an internal trough and an upper edge which is directly above said trough, the said body having a non-transparent band or portion at the level of said trough, and a cover set upon said upper edge and having a flange surrounding the same and also having a non-transparent band to conceal the joint of the cover and the body.

2. An insect-trap comprising a transparent body having an internal trough and an upper edge which is directly above said trough, and a cover set upon said upper edge and having a flange surrounding the same and also having a non-transparent band to conceal the joint of the cover and the body.

3. An insect-trap comprising a transparent body having an internal trough, and a cover for said body, provided with a non-transparent band to conceal the joint of the cover and the body.

4. An insect-trap comprising a transparent body having an internal trough, and a cover set on said body and carrying a fuel-cup with a light-increasing outer surface.

In testimony whereof I have hereunto set my hand in the presence of two subscribing witnesses.

HENRY FREIMANN.

Witnesses:
 HANS V. BRIESEN.
 EUGENE EBLE.